Figure 1:
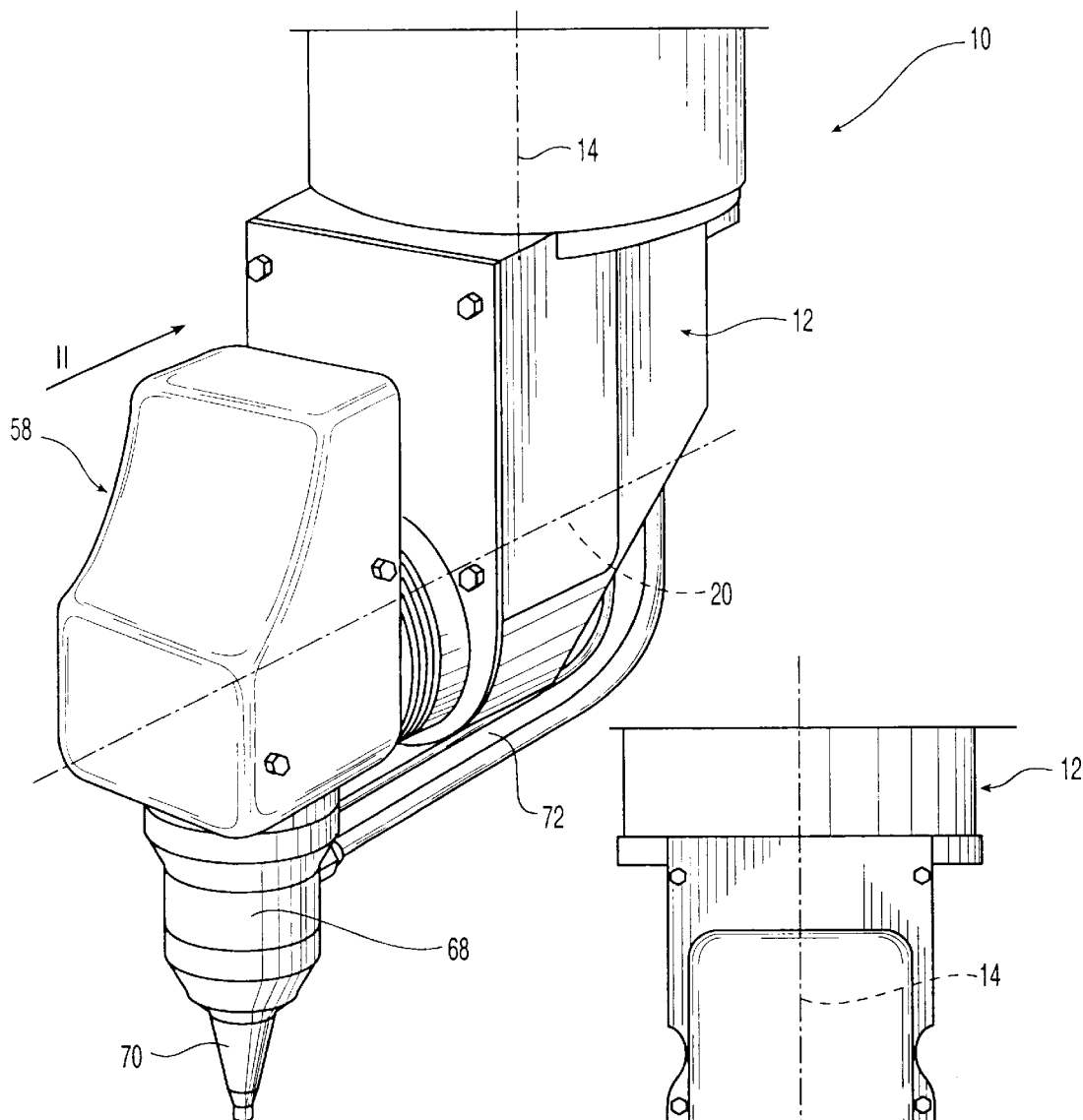

United States Patent [19]
Carbonato et al.

[11] Patent Number: 6,064,033
[45] Date of Patent: May 16, 2000

[54] OPERATIVE HEAD FOR A LASER MACHINE

[75] Inventors: Gianfranco Carbonato, Turin; Alberto Delle Piane, Bruino, both of Italy

[73] Assignees: Prima Industrie SpA, Turin, Italy; The Prima Group International, Charlotte, N.C.

[21] Appl. No.: 09/223,725

[22] Filed: Dec. 31, 1998

[30] Foreign Application Priority Data

Dec. 31, 1997 [IT] Italy .................................. TO97A1155

[51] Int. Cl.⁷ .................................................. B23K 26/00
[52] U.S. Cl. .................................. 219/121.78; 219/121.67
[58] Field of Search ........................ 219/121.67, 121.78, 219/121.79

[56] References Cited

U.S. PATENT DOCUMENTS

| | | | |
|---|---|---|---|
| 3,619,550 | 11/1971 | Carbonato et al. ................. | 219/121.78 |
| 4,618,758 | 10/1986 | Gilli et al. .......................... | 219/121.67 |
| 4,728,771 | 3/1988 | Sartorio .............................. | 219/121.67 |
| 4,825,036 | 4/1989 | Bickel et al. ....................... | 219/121.78 |

*Primary Examiner*—Geoffrey S. Evans
*Attorney, Agent, or Firm*—Sughrue, Mion, Zinn, Macpeak & Seas, PLLC

[57] ABSTRACT

An operative head for a laser machine including a base rotatably mounted about a first axis and carrying a first mirror for receiving a laser beam along the first axis and for deflecting the laser beam along a second axis orthogonal to the first axis, a rotating body carried by the base for rotation about the second axis, and an end body carrying a second mirror for receiving the laser beam along a third axis. The end body is movable with respect to the rotating body along a straight direction parallel to the second axis.

5 Claims, 3 Drawing Sheets

OPERATIVE HEAD FOR A LASER MACHINE

The present invention relates to an operative head for a laser machine.

Operative heads comprising a base intended to be mounted for rotation about a first axis on a movable support member of the machine, a rotating body mounted on the base for rotation about a second axis orthogonal to the first axis and an end body carried by the rotating body, are already known. The base carries a first mirror which in use receives a laser beam along the first axis and deflects the beam along a second axis coincident with the axis of rotation of the rotating body. The rotating body has a second mirror which receives the laser beam along the second axis and deflects the beam along a third axis towards a focusing lenses and an end nozzle.

In a head of this type produced by the same applicant, the end body is movable with respect to the rotating body along a straight direction parallel to the direction of the laser beam exiting from the head. This movement of the end body enables the distance between the nozzle and the piece surface to be maintained constant.

Normally, the base of the operative head is carried by a movable member having two or three degres of freedom, typically constituted by linear motions of translation along two or three axes orthogonal to each other, forming the main axes of the machine.

Machines provided with operative heads of the type specified above have a low working speed when executing operative patterns with small dimensions. In fact, in order to move the laser beam along a bidimensional path contained into a small circle (e.g. with a radius smaller than 20 mm) with a known operative head it is generally necessary to move the main axes of the machine, thereby moving great masses. This limits the working speed of the machine because the accelerations which can be obtained are inversely proportional to the mass which must be moved.

In YAG laser machines various solutions are known which enable the end body to be moved in a field of small dimensions without moving the main axes of the machine. These solutions can not be easily adapted to laser machines in which the beam is guided along an optical path by means of a plurality of mirrors. In fact, in this case the optical transmission system of the laser beam limits the possibility of movement of the end body and involves considerable complexities and high overall dimensions and costs.

The object of the present invention is to provide a simple and inexpensive operative head which enables a mirror-guided laser beam to be moved with high speed along bidimensional paths with small dimensions, without moving the main axes of the machine.

The operative head according to the present invention comprises an end body which is movable with respect to said rotating body along a straight direction parallel to the axis of rotation of the rotating body. With this geometry, it is possible to move the laser beam along any bidimensional path with small dimensions by combining with each other the rotation of the rotating body and the translation of the end body. The optimal operative speeds are very high since the messes of end body and rotating body are very small compared to the masses of the members which are put in motion when the main axes of the machine are operated.

According to a particularly advantageous embodiment of the present invention, the end body forms, together with a connecting element, a self-standing unit which is removable from the rotating body and is replaceable. This feature enables the laser machine to be personalized in view of the type of work which must be carried out. The laser head can be easily adapted to carry out different operations by simply replacing the end body by one of a different type.

Figure 2:
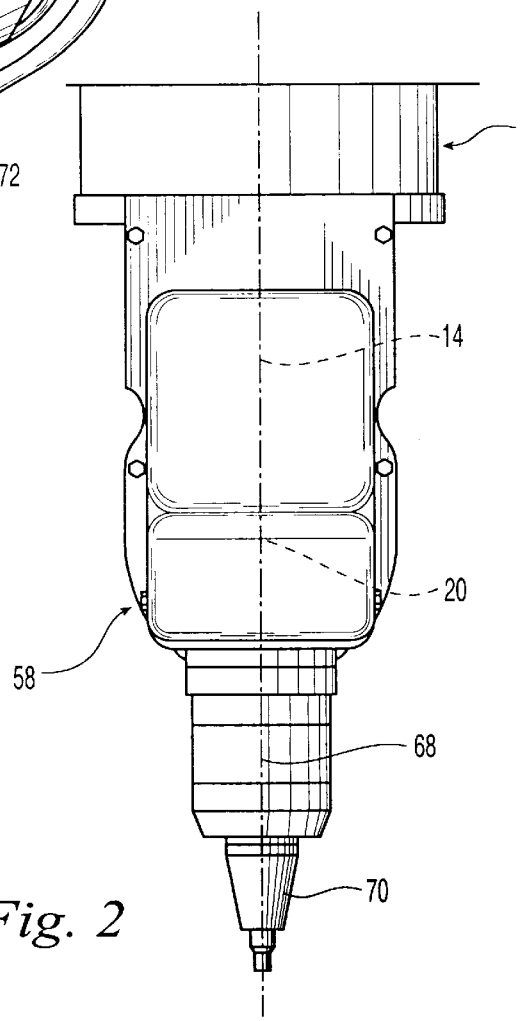
Figure 3:
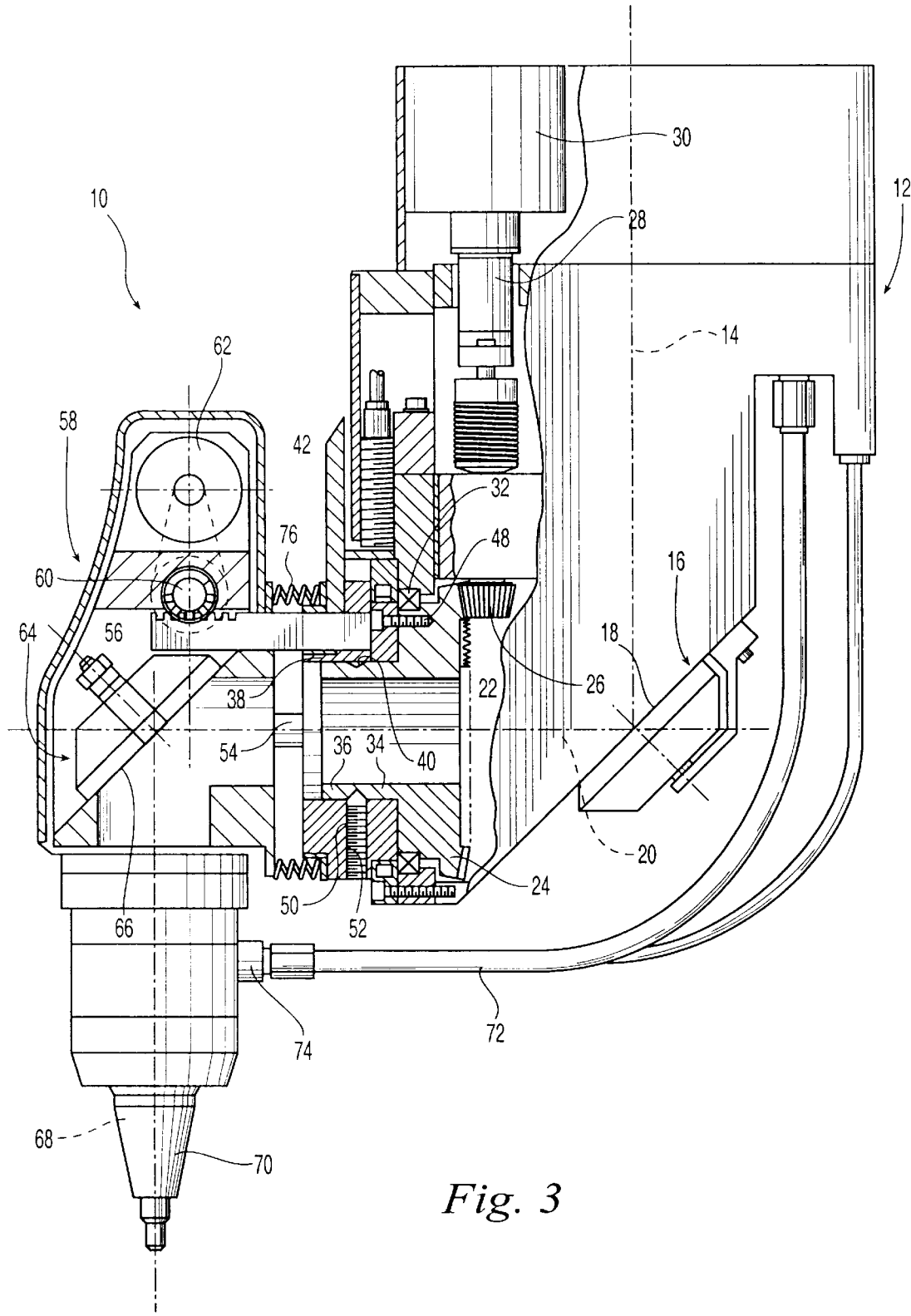
Figure 4:
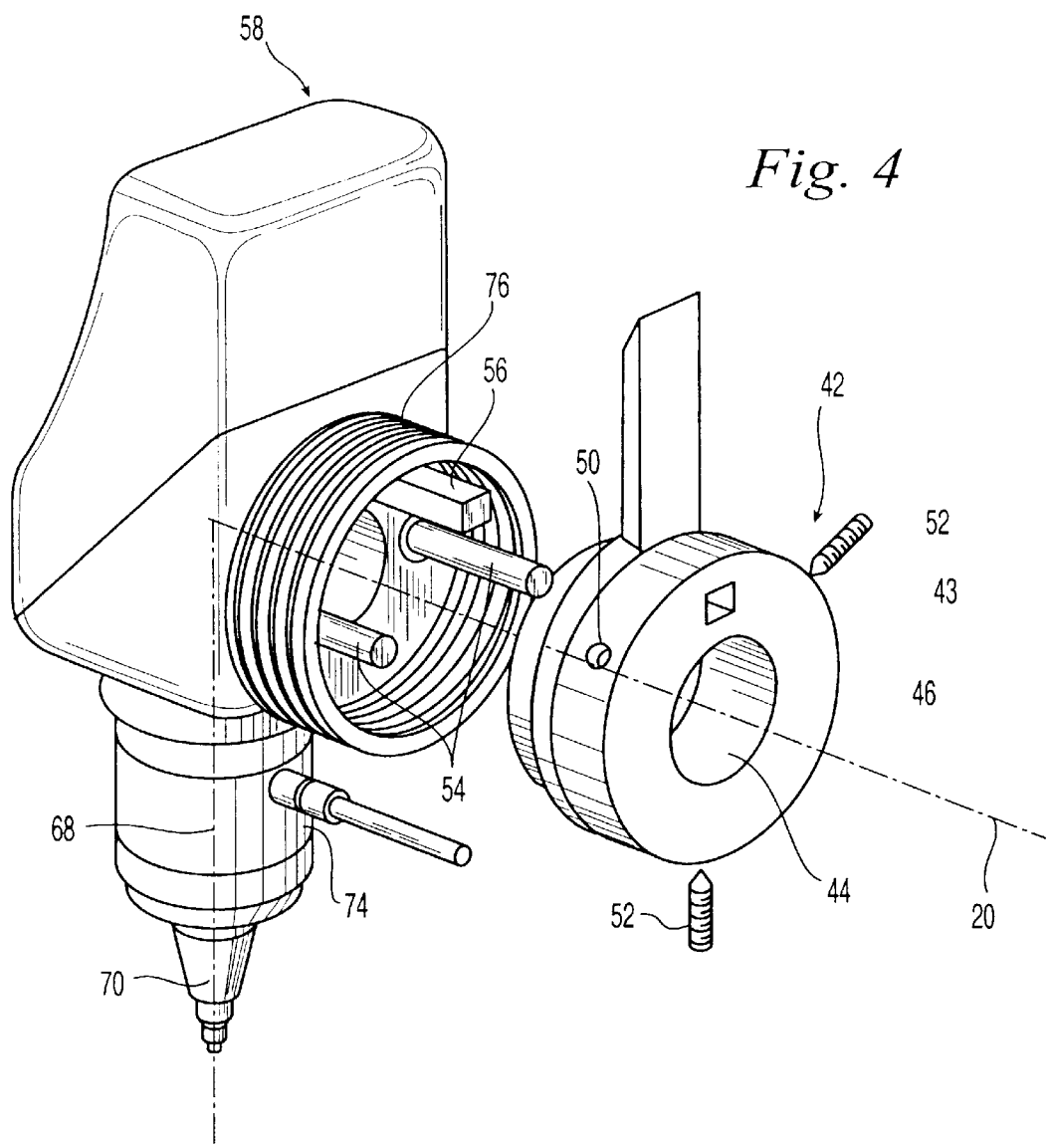
Figure 5:
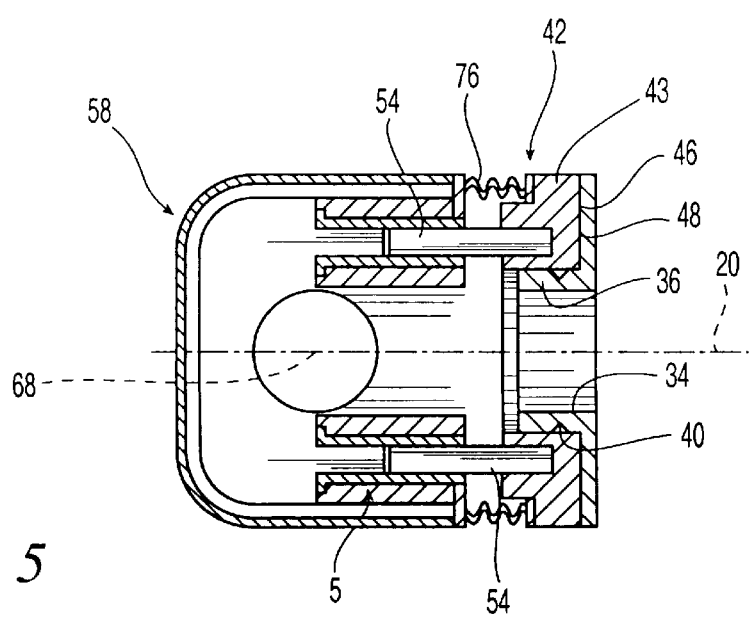

Further characteristics and advantages of the invention will become clear in the course of the detailed description which follows, given purely by way of non-limiting example, with reference to the annexed drawings, in which:

FIG. 1 is a schematic perspective view of an operative head according to the present invention, FIG. 2 is an elevational view along the arrow II of FIG. 1, FIG. 3 is a partial cross section taken on the line III—III of FIG. 2, FIG. 4 is a partially exploded perspective view of the operative head of FIG. 1, and FIG. 5 is a section taken on the line V—V of FIG. 2.

Referring to the drawings, 10 indicates an operative head for a laser machine (not shown). The head 10 comprises a base 12 which is intended to be mounted on a movable support member (not shown) of the laser machine. The base 12 could be fixed to a carriage movable along two horizontal axes x, y and along a vertical axis z, in the case of three-axes machines. As an alternative, in five-axes machines, the base 12 can be mounted for rotation about a vertical axis 14 at the lower end of a vertically movable pillar which in its turn is carried by a carriage movable along two horizontal axes orthogonal to each other.

The support member of the laser machine carrying the base 12 is provided with a numerically controlled motor of a type per se known which rotates the operative head 10 about the axis 14. As shown in FIG. 3, the base 12 carries a first mirror 16 having a reflecting surface 18 forming an angle of 45° with respect to the axis of rotation 14. In use, the mirror 16 receives a laser beam along the axis 14 and deflects the beam of 90° along an axis 20.

The base 12 carries a rotating body 22 which can rotate about an axis coincident with the axis 20 of the laser beam deflected by the first mirror 16. The rotating body 12 is fixed to a crown gear 24 meshing with a pinion gear 26 connected to the shaft 28 of a numerically controlled motor 30 carried either by the base 12 or by the overhanging support member (carriage or pillar). The rotating body 22 is connected to the base 12 by means of a roller bearing 32 and has a through hole 34 through which the laser beam extends in use. As shown in FIGS. 3 and 5, the rotating body 22 has also a tubular portion 36 having an outer cylindrical surface 38 on which a V-shaped annular groove 40 is formed.

A connecting element 42 is removably mounted on the tubular portion 36 of the rotating body 22, the connecting element having an annular body 43 with an inner cylindrical surface 44 slidably mounted on the outer cylindrical surface 38 of the tubular portion 36. The annular body 43 has a flat front surface 46 abutting against a reference plate 48 fixed to the rotating body 22. The connecting element 42 is provided with two or more threaded radial holes 50 in which respective screws 52 are inserted, which engage the V-shaped groove 40 of the rotating body 22. The connecting element 42 can be easily removed from the rotating body 22. For removing the rotating body it is sufficient to loosen the screws 22 and axially extracting the connecting element 42 from the tubular portion 36.

The connecting element 42 carries a pair of cylindrical guide members 54 and a rack element fixed to the annular body 43. The guide members 54 and the rack element 56 extend parallel to the axis 20 and project axially from the annular body 43.

An end body 58 is slidably mounted on the guide member 54 and is movable in a direction parallel to the axis 20. The end body 58 carries a gear 60 which engages the rack element 56. The gear 60 is driven by a numerically controlled motor 62 carried by the end body 58.

The end body 58 carries a second mirror 64 having a reflecting surface 66 forming an angle of 45° with respect to the axis 20. In use, the mirror 64 receives a laser beam along the axis 20 and deflects the laser beam along a third axis 68. In a way generally per se known, the end body 58 carries a focusing lens (not shown) which directs the focused laser beam towards an exit nozzle 60. The end body 58 is connected to one or more flexible pipes 72 by means of fast-fitting couplings 74. In a way per se known in use the pipes 72 supply the nozzle 70 with a gas flow.

A flexible protection bellows 76 is placed between the connecting element 42 and the end body 58 and surrounds a zone between these two elements through which in use the laser beam extends. In use, the laser beam exiting from the end body 58 can be directed on any point of a work area of small dimensions without moving the main axes of the machine. After the head 10 has been positioned and oriented in a predetermined work zone by moving the main axes of the machine and by angularly orienting the output axis of the laser beam along the desired direction, the base 12 can be maintained stationary and the laser beam can be moved along a generic bidimensional path of small dimensions by controlling the rotation of the movable body 22 about the axis 20 and the translation of the end body 58 in a direction parallel to the axis 20. The motors 30 and 62 which control respectively the rotation of the body 22 and the translation of the end body 58 are controlled by a computer programmed for generating the desired path of the laser beam by combining rotation and translation of the end body 58.

A particularly advantageous aspect of the present invention consists in that the end body 58 and the connecting element 42 form a self-standing unit which can be easily removed from the remaining part of the head 10. This features render the laser machine very versatile because, by replacing only the end portion, the machine can be configured for special operations. In particular, a laser machine equipped with an end body 58 according to the present invention will be particularly suitable for instance for carrying out with high speed a plurality of small holes or slots, in addition to normal cutting and welding operations carried out by moving the main axes of the machine.

What is claimed is:

1. An operative head for a laser machine, comprising:
   a base intended to be mounted on a movable support member of the machine, the base carrying a first mirror for receiving a laser beam along said first axis and for deflecting the laser beam along a second axis orthogonal to the first axis,
   a rotating body carried by the base for rotation about said second axis, and
   an end body movable with respect to the rotating body and carrying a second mirror for receiving the laser beam along said second axis and for deflecting the laser beam along a third axis,
   wherein the end body is movable with respect to the rotating body along a straight direction parallel to said second axis.

2. An operative head according to claim 1, comprising a connecting element carrying guide means on which the end body is slidably mounted, the connecting element being removably fixed to the rotating body.

3. An operative head according to claim 2, wherein the connecting element and the end body form a replaceable self-standing unit.

4. An operative head according to claim 2, wherein said connecting element carries a rack member cooperating with a gear which is driven by a motor carried by the end body.

5. An operative head according to claim 2, wherein said rotating body has a tubular portion provided with a V-shaped annular groove, and in that said connecting element comprises an annular body slidably fitted on the tubular portion, the connecting element being fixed to the annular body by means of radial screws engaging said groove.

* * * * *